United States Patent [19]

Nakamura

[11] Patent Number: 5,648,608
[45] Date of Patent: Jul. 15, 1997

[54] VIBRATING GYROSCOPE DETECTING SYSTEM

[75] Inventor: Takeshi Nakamura, Nagaokakyo, Japan

[73] Assignee: Murata Manufacturing Co., Ltd., Kyoto-fu, Japan

[21] Appl. No.: 408,924

[22] Filed: Mar. 22, 1995

[30] Foreign Application Priority Data

Mar. 30, 1994 [JP] Japan .................................. 6-085764

[51] Int. Cl.$^6$ .......................... G01C 19/00; G01P 9/00; G01P 3/44; H01L 41/00
[52] U.S. Cl. ........................ 73/504.12; 73/504.14; 310/316
[58] Field of Search ...................... 73/504.12, 504.13, 73/504.14, 504.02; 310/315, 316

[56] References Cited

U.S. PATENT DOCUMENTS

| | | | |
|---|---|---|---|
| 5,220,833 | 6/1993 | Nakamura | 73/505 |
| 5,349,856 | 9/1994 | Nakamura | 73/505 |
| 5,355,034 | 10/1994 | Nakamura et al. | 307/491 |
| 5,412,204 | 5/1995 | Nakamura | 250/231.12 |
| 5,473,288 | 12/1995 | Kumada | 331/116 R |
| 5,495,759 | 3/1996 | Nakamura | 73/504.12 |
| 5,505,085 | 4/1996 | Kasanami et al. | 73/504.14 |

*Primary Examiner*—Hezron E. Williams
*Assistant Examiner*—Richard A. Moller
*Attorney, Agent, or Firm*—Nikaido Marmelstein Murray & Oram LLP

[57] ABSTRACT

A vibrating gyroscope 10 includes a vibrator 12 including a regular triangular prism-shaped vibrating body 14 and piezoelectric elements 16a, 16b and 16c. Bending vibration of the vibrating body 14 occurs due to the operation of an oscillation circuit 32 including an amplifying circuit 34 and a phase correction circuit 36. The piezoelectric elements 16a and 16b are connected with first and second switching circuits 40 and 46 via detection circuits 38 and 44. Control signals having phases opposite to each other are supplied to the first and second switching circuits 40 and 46 by using an inverting circuit 50. The first and second switching circuits 40 and 46 are alternately intermittently operated by receiving the control signals. Output signals of the first and second switching circuits 40 and 46 are smoothed by a smoothing circuit 52 and amplified by an amplifying circuit 54.

12 Claims, 11 Drawing Sheets

OUTPUT SIGNAL OF PIEZOELECTRIC ELEMENT 16a

FIG.5(B)

OUTPUT SIGNAL OF PIEZOELECTRIC ELEMENT 16b

FIG.5(C)

INPUT SIGNAL OF SMOOTHING CIRCUIT 52

FIG.5(D)

OUTPUT SIGNAL OF SMOOTHING CIRCUIT 52

FIG.6(A)

OUTPUT SIGNAL OF PIEZOELECTRIC ELEMENT 16a

FIG.6(B)

OUTPUT SIGNAL OF PIEZOELECTRIC ELEMENT 16b

FIG.6(C)

INPUT SIGNAL OF SMOOTHING CIRCUIT 52

FIG.6(D)

OUTPUT SIGNAL OF SMOOTHING CIRCUIT 52

VIBRATING GYROSCOPE DETECTING SYSTEM

BACKGROUND OF THE INVENTION

1. Field of the Invention

The present invention relates to a vibrating gyroscope detecting system, and more particularly to a vibrating gyroscope detecting system for detecting a rotational angular velocity based on two detecting signals obtained from a vibrating gyroscope which comprises a prism-shaped vibrator.

2. Description of the Prior Art

Figure 10:
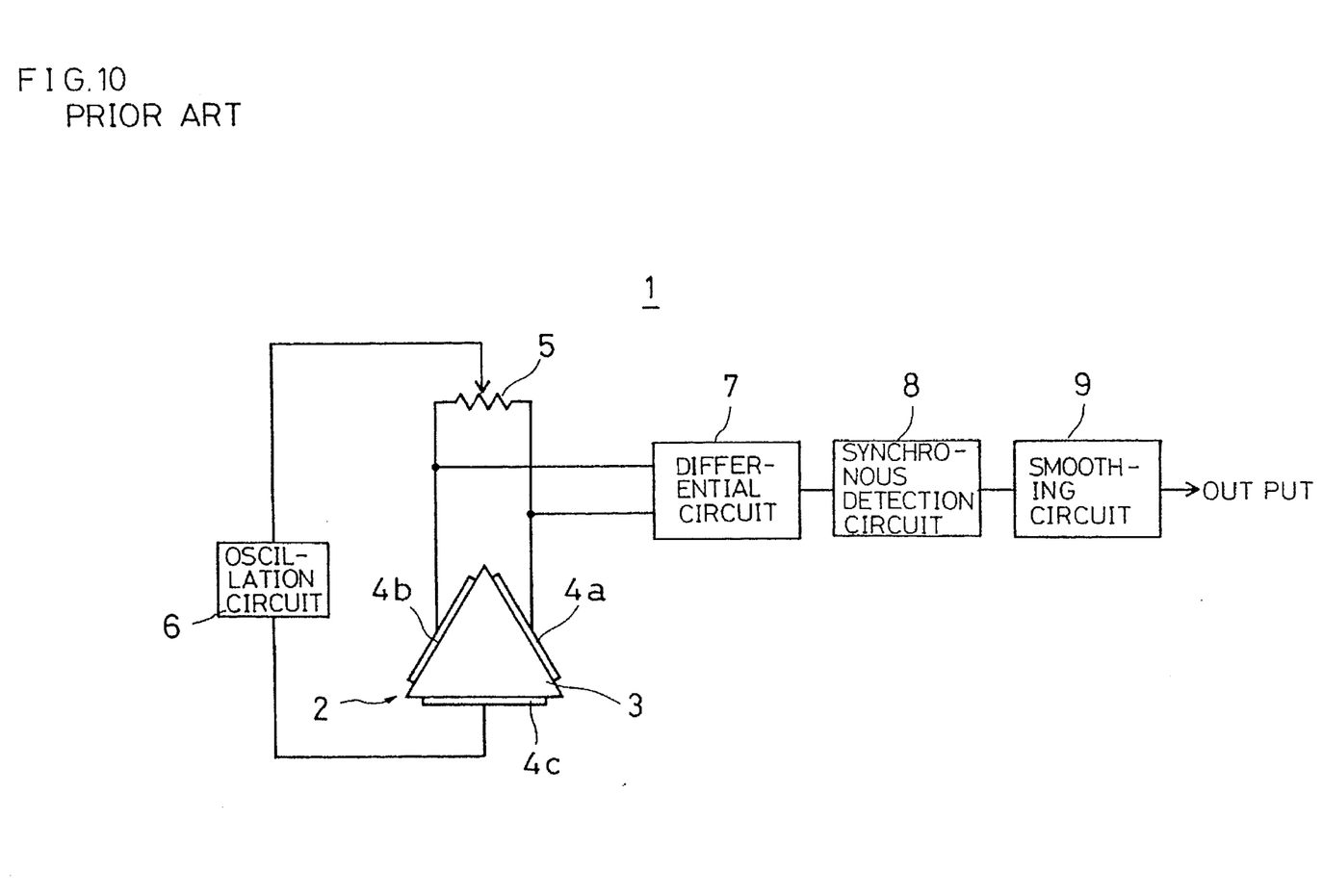
FIG. 10 is an illustrative view showing an example of a vibrating gyroscope in which a conventional vibrating gyroscope detecting system is used.

FIG. 10 is an illustrative view showing a vibrating gyroscope in which a conventional vibrating gyroscope detecting system is used. A vibrating gyroscope 1 comprises a vibrator 2. The vibrator 2 comprises a regular triangular prism-shaped vibrating body 3, and piezoelectric elements 4a, 4b, and 4c formed at the center portion of each of three side faces of the vibrating body 3. A variable resistor 5 is connected between the piezoelectric elements 4a and 4b. An oscillation circuit 6 is connected between the variable resistor 5 and the piezoelectric element 4c. An output signal of the oscillation circuit 6 is supplied to the piezoelectric elements 4a and 4b. An output signal of the piezoelectric element 4c is fed back to the oscillation circuit 6. In the vibrating body 3, bending vibration occurs in a direction perpendicular to the surface on which the piezoelectric element 4c is formed.

The piezoelectric elements 4a and 4b are connected with a differential circuit 7. An output signal of the differential circuit 7 is detected by a synchronous detection circuit 8 and then smoothed by a smoothing circuit 9. When a rotational angular velocity is not applied to the vibrating gyroscope, the vibrating body 3 bends and vibrates in a direction perpendicular to the face on which the piezoelectric element 4c is formed, thus output signals of the piezoelectric elements 4a and 4b are the same signal. Since the rotational angular velocity is not applied to the vibrating gyroscope 1 at this time, the output signals of the piezoelectric elements 4a and 4b are driving signals. However, actually, the output signals of the piezoelectric elements 4a and 4b are different from each other due to the variation of processing accuracy of the vibrating body 3 or the piezoelectric elements 4a, 4b and 4c. Thus, the variable resistor 5 is adjusted so that the same signals are supplied to the differential circuit 7. Therefore, the output signal of the differential circuit 7 is zero.

Figure 11A:
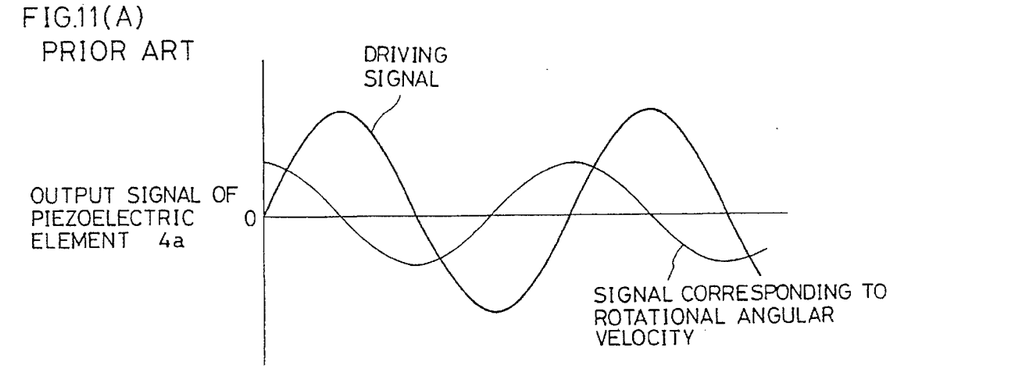
FIGS. 11(A) and 11(B) are graphs showing output signals of two piezoelectric elements of the conventional vibrating gyroscope shown in FIG. 10.
Figure 11B:
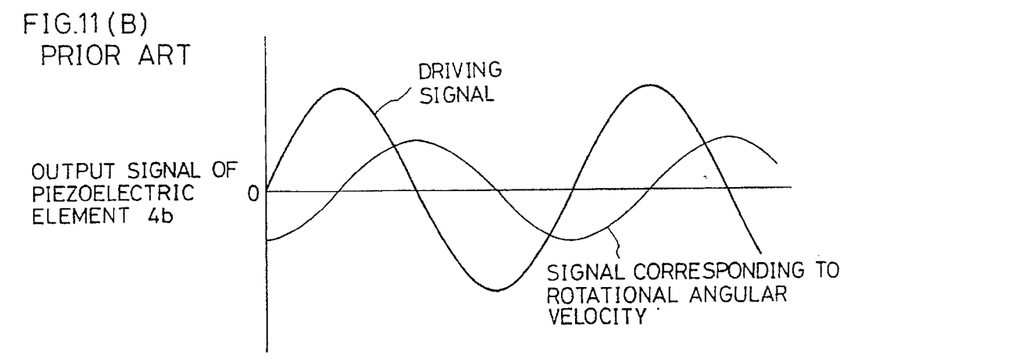

The bending vibration direction of the vibrating body 3 is changed by a Coriolis force when the vibrator 2 is rotated on the axis of the vibrating body 3. As a result, the different signals are generated in the piezoelectric elements 4a and 4b. Since the change of the signals generated in the piezoelectric elements 4a and 4b correspond to the change in the vibration direction of the vibrating body 3, the signals generated in the piezoelectric elements 4a and 4b correspond to the rotational angular velocity. As shown in FIGS. 11(A) and 11(B), phase difference between the signal corresponding to the rotational angular velocity and the driving signal is 90°. Since the driving signal components supplied from the piezoelectric elements 4a and 4b to the differential circuit 7 have the same phase and level, they are offset by the differential circuit 7. Since the piezoelectric elements 4a and 4b are positioned symmetrically with respect to the direction of the vibration of the vibrating body 3 when the vibrator 2 is not rotated, signals of opposite polarities are generated in the piezoelectric elements 4a and 4b when the vibration direction of the vibrating body 3 is changed due to the rotational angular velocity. Thus, a large signal corresponding to the rotational angular velocity can be obtained by taking the difference between the output signals of the piezoelectric elements 4a and 4b in the differential circuit 7. The rotational angular velocity applied to the vibrator 2 can be detected by synchronously detecting a positive portion or a negative portion of the output signal of the differential circuit 7 and smoothing it.

Figure 12:
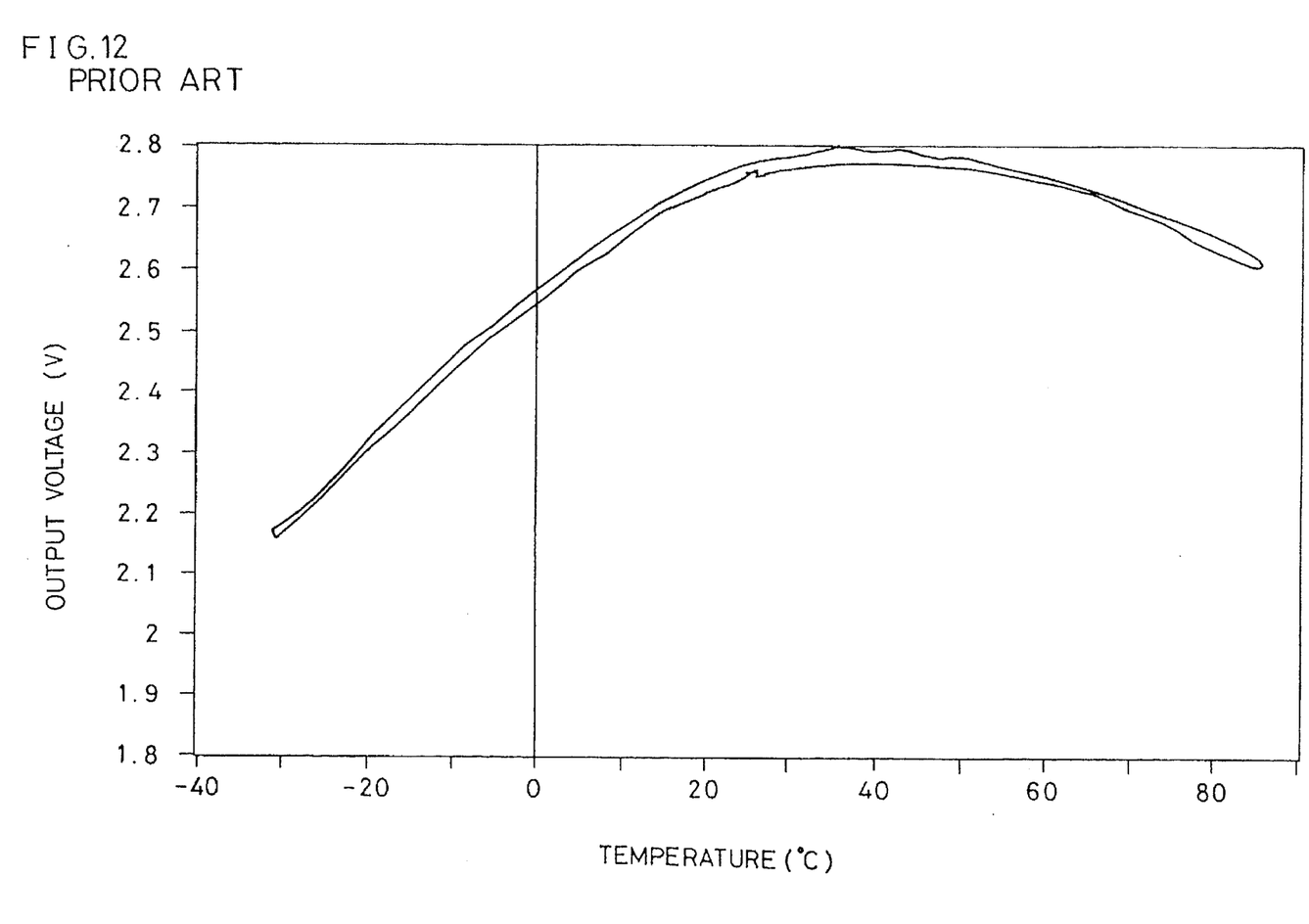
FIG. 12 is a graph showing an output signal of the conventional vibrating gyroscope shown in FIG. 10.

In such a vibrating gyroscope, the variable resistor is adjusted in such a manner that the output signal of the differential circuit is zero when the vibrator is not rotated. However, there is a case that the characteristics of the vibrator is fluctuated due to the change in atmospheric temperature or the like. In particular, the levels of driving signal components are fluctuated due to the change in the atmospheric temperature. When the levels of the driving signal components obtained from two piezoelectric elements are different from each other, they are not offset by the differential circuit but appears as an output signal thereof. That is, as shown in FIG. 12, the output signal of the differential circuit fluctuates due to the change in the atmospheric temperature, even though the rotational angular velocity is not applied to the vibrator. Since the fluctuation of the output signal forms a curve with the change in the atmospheric temperature, it is difficult to compensate the fluctuation. Accordingly, the driving signal component is overlapped with the signal corresponding to the rotational angular velocity, and hence it is impossible to detect the rotational angular velocity accurately.

SUMMARY OF THE INVENTION

It is therefore an object of the present invention to provide a vibrating gyroscope detecting system in which an output signal fluctuates linearly with the change in atmospheric temperature when a vibrator is not rotated and hence can be easily corrected.

The present invention relates to a vibrating gyroscope detecting system comprising a vibrating gyroscope for obtaining two detecting signals so as to detect a rotational angular velocity by utilizing a vibration of the prism-shaped vibrator, and two switching circuits for intermitting the two detecting signals, wherein the two switching circuits are operated alternately so as to obtain a composite signal by composing output signals of the two switching circuits.

In the vibrating gyroscope detecting system, the two switching circuits are operated in synchronous with the generation of a signal corresponding to the rotational angular velocity.

A differential circuit for subtracting ½ of the sum of the two detecting signals from the composite signal may be additionally provided.

Further, a temperature compensating circuit for compensating an composite signal according to the change in atmospheric temperature may be additionally provided.

Since there is a phase difference of 90° between the driving signal for driving the vibrating gyroscope and the signal corresponding to the rotational angular velocity, a positive portion of the signal corresponding to the rotational angular velocity or a negative portion thereof is obtained by outputting the two detecting signals alternately in synchronous with the generation of the signal corresponding to the rotational angular velocity. At this time, positive and negative portions of the driving signal contained in one of the detecting signals and positive and negative portions of the driving signal contained in the other detecting signal are obtained alternately. Accordingly, the positive and negative portions of the driving signal are offset by composing the output signals of the two switching circuits and then smoothing them. Since the positive portion of the signal corresponding to the rotational angular velocity or the negative portion thereof is obtained, a direct current signal can be obtained by smoothing the signal corresponding to the rotational angular velocity. Since the direct current signal corresponds to the rotational angular velocity, the rotational angular velocity applied to the vibrating gyroscope can be detected by measuring the output signal of the smoothing circuit.

Half of the sum of the output signals of the two detecting circuits is almost equal to the driving signal contained in the composite signal obtained by composing the output signals of the two switching circuits. Therefore, the driving signal is almost removed by subtracting ½ of the sum of the output signals of the detecting circuits from the composite signal. The driving signal which has remained in the composite signal is offset by smoothing it. At this time, since the signals corresponding to the rotational angular velocity contained in the two detecting signals are opposite to each other in polarity, the signals are offset by taking the sum of the output signals of the two detecting circuits. Accordingly, even though ½ of the sum of the output signals of the detecting circuits is subtracted from the composite signal, there is no change in the signals corresponding to the rotational angular velocity contained in the composite signal.

According to the vibrating gyroscope detecting system, since driving signal components contained in the detecting signal can be removed, even though the driving signal components are fluctuated due to the change in atmospheric temperature, the level difference of the driving signal components is removed, and the phase difference between the driving signal components can be obtained as a signal having a preferable linearity. Thus, the inclination of the signal in accordance with the change in temperature can be easily compensated by using the temperature compensating circuit.

Owing to the method of offsetting the driving signal components, since the output signal has a preferable linearity even though the atmospheric temperature is changed, a temperature compensation can be easily accomplished. Thus, even though the atmospheric temperature is changed, a signal having a small fluctuation can be obtained. Accordingly, even though the atmospheric temperature is changed, the rotational angular velocity can be accurately detected.

The above and further objects, features, aspects, and advantages of the present invention will be more fully apparent from the following detailed description of the accompanying drawings.

DESCRIPTION OF THE PREFERRED EMBODIMENTS

Figure 1:
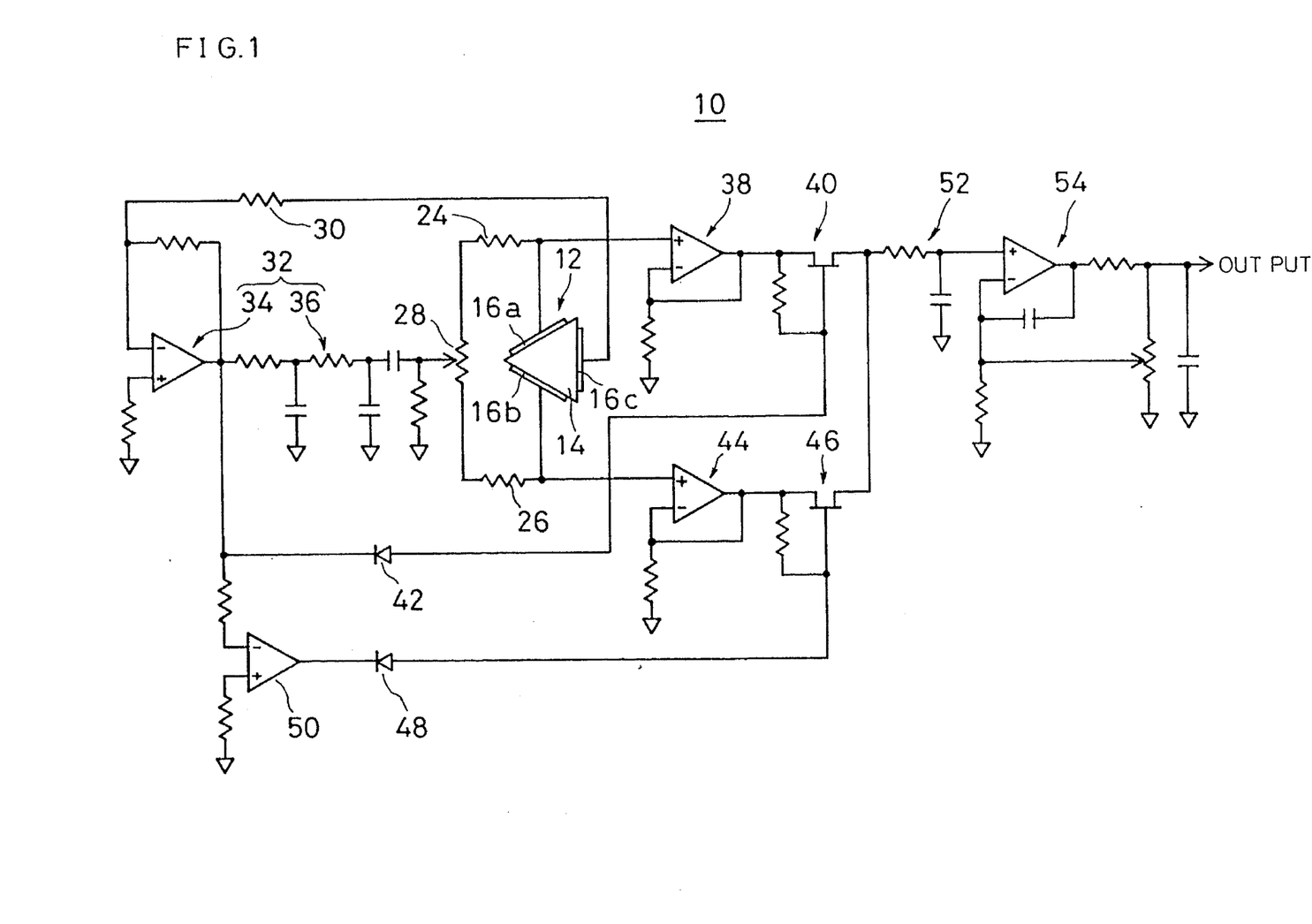
FIG. 1 is a circuit diagram showing an example of a vibrating gyroscope in which a vibrating gyroscope detecting system according to the present invention is used.
Figure 2:
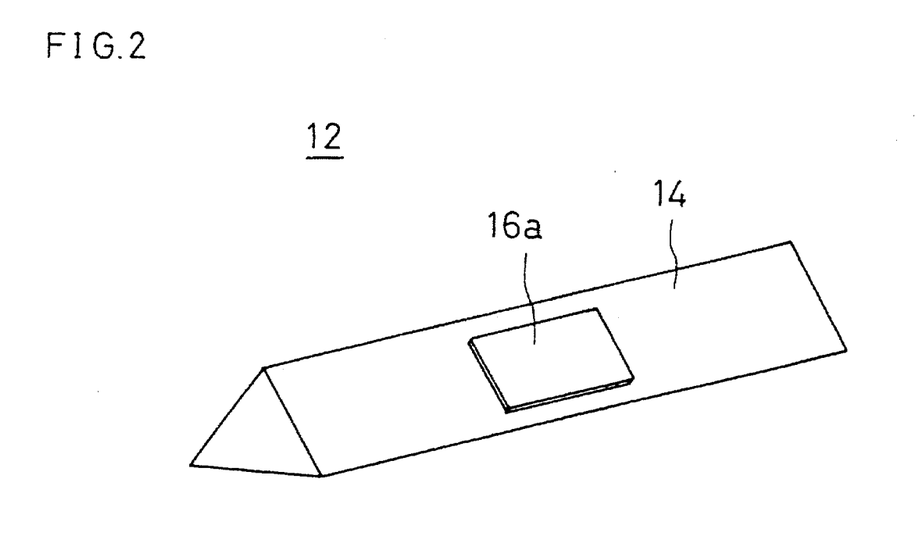
FIG. 2 is a perspective view showing a vibrator for use in the vibrating gyroscope shown in FIG. 1.
Figure 3:
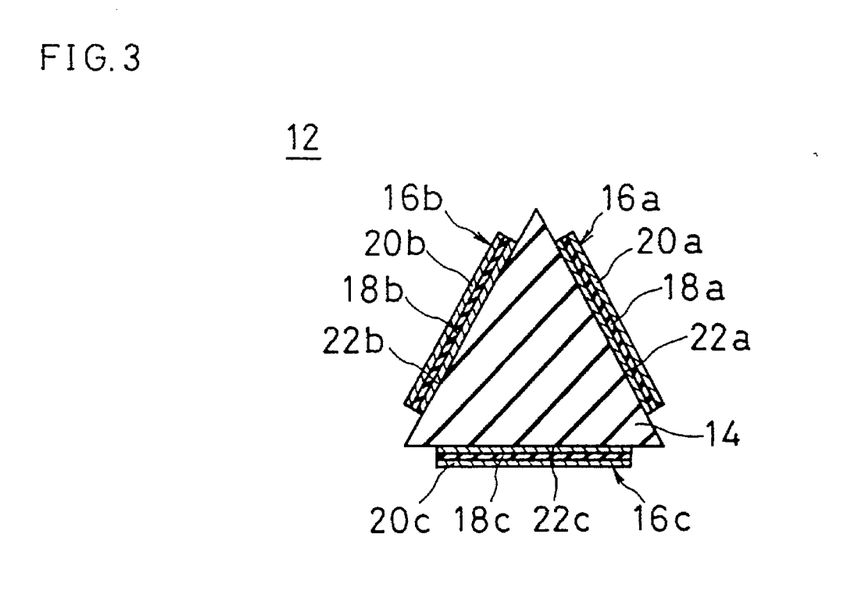
FIG. 3 is a sectional view showing the vibrator shown in FIG. 2.

FIG. 1 is a circuit diagram showing an example of a vibrating gyroscope in which a vibrating gyroscope detecting system according to the present invention is used. A vibrating gyroscope 10 comprises a vibrator 12. As shown in FIG. 2, the vibrator 12 comprises a regular triangular prism-shaped vibrating body 14. The vibrating body 14 is made of a material which makes a mechanical vibration such as elinver, iron-nickel alloy, quarts, glass, crystal, ceramics or the like. Piezoelectric elements 16a, 16b and 16c are formed at the center portion of each of three side faces of the vibrating body 14. As shown in FIG. 3, the piezoelectric element 16a comprises a piezoelectric layer 18a made of piezoelectric ceramics or the like. Electrodes 20a and 22a are formed on both faces of the piezoelectric layer 18a, and the electrode 22a is bonded to the vibrating body 14 with adhesive agent or the like. Similarly, the piezoelectric elements 16b and 16c comprise a piezoelectric layer 18b and 18c, respectively. Electrodes 20b and 22b are formed on both faces of the piezoelectric layer 18b, and electrodes 20c and 22c are formed on both faces of the piezoelectric layer 18c. The electrodes 22b and 22c are bonded to the vibrating body 14 with adhesive agent or the like.

Resistors 24 and 26 are connected with the piezoelectric elements 16a and 16b, respectively. The resistors 24 and 26 are connected with a variable resistor 28. A resistor 30 is connected with the piezoelectric element 16c. An oscillation circuit 32 is connected between the variable resistor 28 and the resistor 30. The oscillation circuit 32 comprises an amplifying circuit 34 and a phase correction circuit 36. The amplifying circuit 34 is formed by combining an operational amplifier and resistors with each other. The phase correction circuit 36 is formed by combining a resistors and a capacitors with each other. An output signal of the piezoelectric element 16c is fed back to the amplifying circuit 34, and then corrected by the phase correction circuit 36. The output signal of the oscillation circuit 32 is supplied to the piezoelectric elements 16a and 16b. As a result, in the vibrating body 14, bending vibration occurs in a direction perpendicular to the face on which the piezoelectric element 16c is formed.

The piezoelectric element 16a is connected with a detection circuit 38, and the detection circuit 38 is connected with a first switching circuit 40. For example, an n-channel FET is used as the first switching circuit 40. The drain of the FET is connected with the detection circuit 38, while the source thereof is connected with a smoothing circuit 52 which will be described later. An output signal of the oscillation circuit 32 is supplied to the gate of the FET via a diode 42 as a control signal. Accordingly, when a negative signal is supplied to the gate of the FET, an output signal of the detection circuit 38 is transmitted to the smoothing circuit.

The piezoelectric element 16b is connected with a detection circuit 44, and the detection circuit 44 is connected with a second switching circuit 46. For example, an n-channel FET is used as the second switching circuit 46. The drain of the FET is connected with the detection circuit 44, while the source thereof is connected with the source of the FET to be used similar to the first switching circuit 40. Thus, an output signal of the first switching circuit 40 and an output signal of the second switching circuit 46 are composed. Via a diode 48, an inverting circuit 50 is connected with the gate of the FET to be used as the second switching circuit 46. In the inverting circuit 50, the output signal of the oscillation circuit 32 is inverted, and the output signal of the inverting circuit 50 is supplied to the gate of the FET as a control signal. Thus, the phase of the control signal supplied to the first switching circuit 40 is opposite to that of the control signal supplied to the second switching circuit 46. As a result, signals are alternately obtained from the first switching circuit 40 and the second switching circuit 46.

Figure 4:
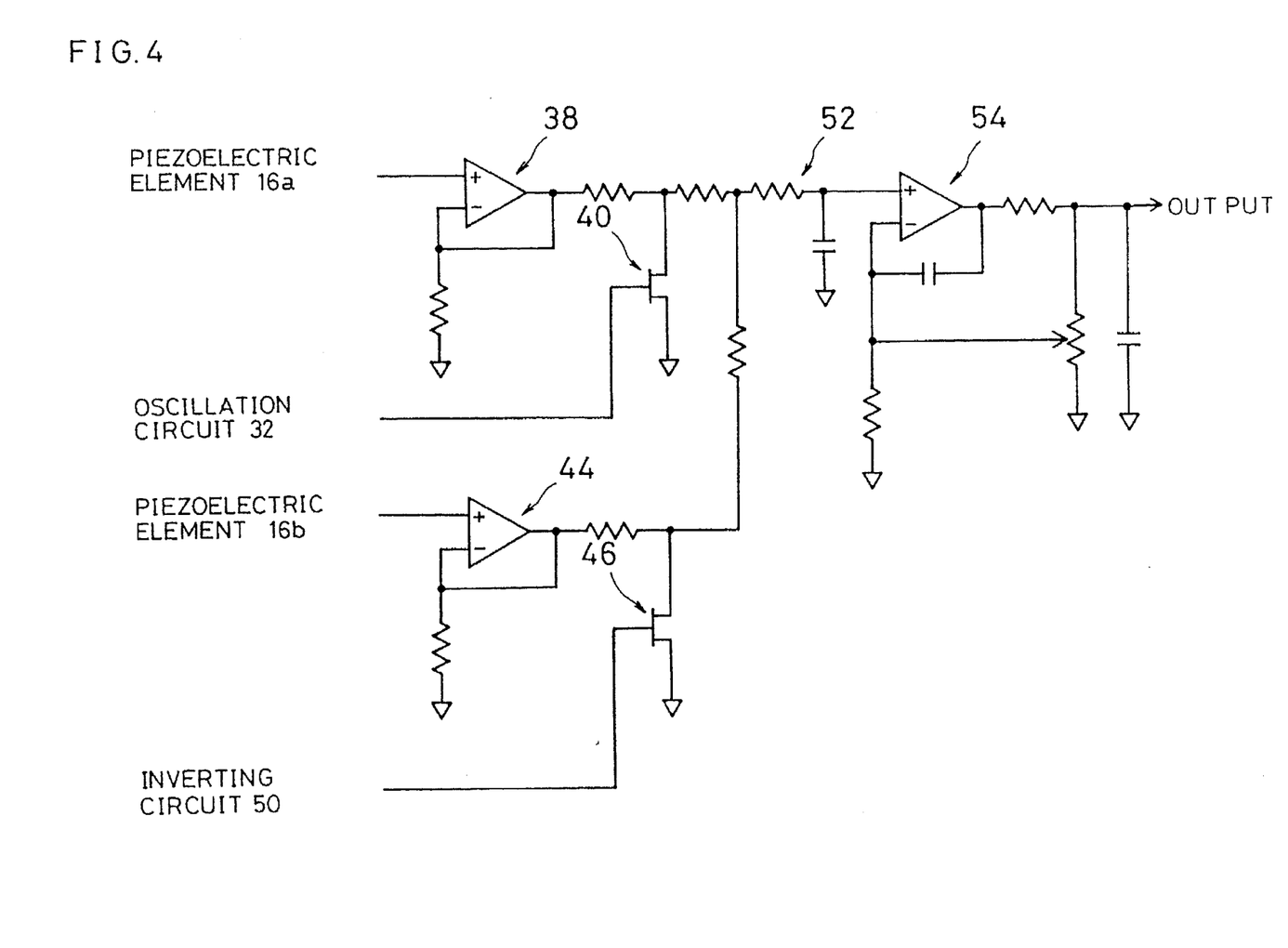
FIG. 4 is a circuit diagram showing a modification of first and second switching circuits for use in the vibrating gyroscope shown in FIG. 1.

In this embodiment, though the n-channel FET is used as the first switching circuit 40 and the second switching circuit 46, it is possible to use a p-channel FET as one of the first switching circuit 40 or as the second switching circuit 46. This construction eliminates the provision of the inverting circuit 50, and the same signal can be supplied to the first switching circuit 40 and the second switching circuit 46. In such construction, the signals can be obtained alternately from the first switching circuit 40 and the second switching circuit 46. As shown in FIG. 4, the source of the FET may be connected with a midpoint of the supply voltage, and the drain thereof may be connected with the detection circuit and the smoothing circuit. In this case, when the FET is turned ON, an output signal of the detection circuit is not transmitted to the smoothing circuit, whereas when the FET is turned OFF, the output signal of the detection circuit is transmitted to the smoothing circuit.

The output signal of the first switching circuit 40 and that of the second switching circuit 46 are supplied to the smoothing circuit 52. The smoothing circuit 52 is composed of, for example, a resistor and a capacitor. The smoothing circuit 52 is connected with an amplifying circuit 54. The amplifying circuit 54 is composed of, for example, an operational amplifier, resistors, capacitors, and a variable resistor.

Figure 5A:
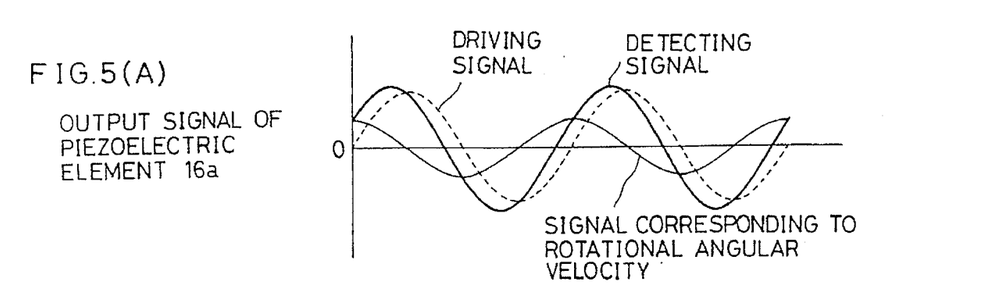
FIGS. 5(A)–5(D) are graphs showing output signals of two piezoelectric elements and input and output signals of a smoothing circuit when there is no difference between the levels of driving signals.
Figure 5B:
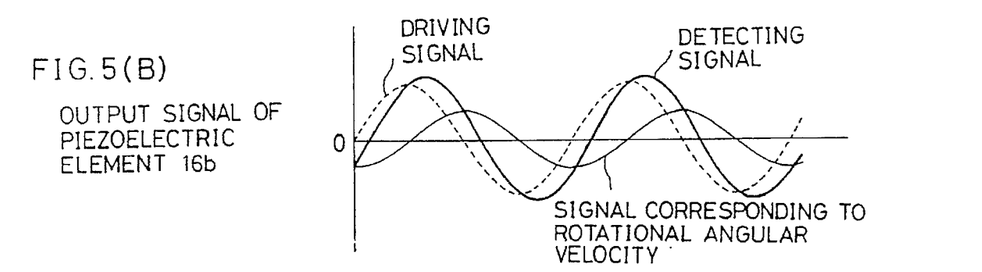

In the vibrating body 14 of the vibrating gyroscope 10, by the output signal of the oscillation circuit 32, bending vibration occurs in a direction perpendicular to the face on which the piezoelectric element 16c is formed. When rotational angular velocity is not applied to the vibrating gyroscope 10, the same signal is obtained from the piezoelectric elements 16a and 16b. Since rotational angular velocity is not applied to the vibrating gyroscope 10 at this time, the output signals of the piezoelectric elements 16a and 16b are driving signals. When the vibrator 12 is rotated on the axis of the vibrating body 14, the bending vibration direction of the vibrating body 14 is changed by a Coriolis force. As a result, different signals are generated in the piezoelectric elements 16a and 16b as shown in FIGS. 5(A) and 5(B). Since the change of the signals corresponds to the change in the vibration direction of the vibrating body 14, the signals generated in the piezoelectric elements 16a and 16b have a phase difference of 90° with respect to the driving signal, and correspond to the rotational angular velocity. Since the piezoelectric elements 16a and 16b are positioned symmetrically with respect to the vibration direction of the vibrating body 14 when the vibrator 12 is not rotated, the phase of the signal generated in the piezoelectric elements 16a is opposite to that of the signal generated in the piezoelectric element 16b. A composite signal obtained by composing the driving signal and the signal corresponding to the rotational angular velocity are obtained from the piezoelectric elements 16a and 16b as detecting signals.

Figure 5C:
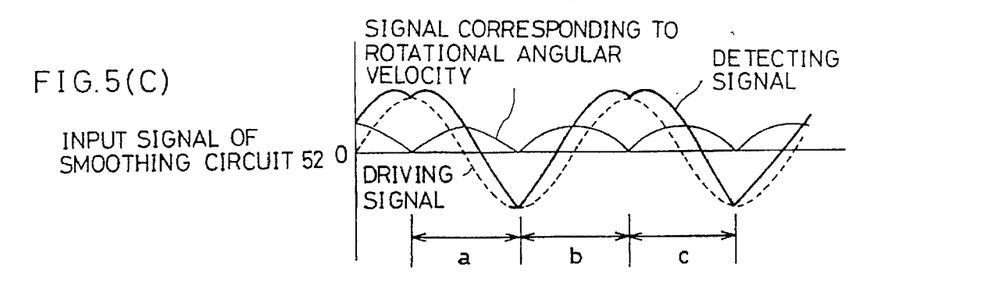

The detecting signals obtained from the piezoelectric elements 16a and 16b are supplied to the first switching circuit 40 and the second switching circuit 46 via the detection circuits 38 and 44, respectively. As shown in FIG. 5(C), by receiving the control signals, signals are obtained from the first and second switching circuits 40 and 46 in synchronous with the signal corresponding to the rotational angular velocity. For example, as shown by a range (a) of FIG. 5(C), an output signal from the detection circuit 44 is obtained from the second switching circuit 46 in synchronous with the signal corresponding to the rotational angular velocity obtained from the piezoelectric element 16b. At this time, no signals are obtained from the first switching circuit 40. Thus, a positive portion of the signal corresponding to the rotational angular velocity and positive and negative portions of the driving signal are supplied to the smoothing circuit 52.

Then, as shown by a range (b) of FIG. 5(C), an output signal from the detection circuit 38 is obtained from the first switching circuit 40 in synchronous with the signal corresponding to the rotational angular velocity obtained from the piezoelectric element 16a. At this time, no signals are obtained from the second switching circuit 46. Thus, a positive portion of the signal corresponding to the rotational angular velocity and positive and negative portions of the driving signal are supplied to the smoothing circuit 52. Then, as shown by a range (c) of FIG. 5(C), an output signal of the detection circuit 44 is obtained from the second switching circuit 46. In this manner, the first switching circuit 40 and the second switching circuit 46 are operated alternately. Accordingly, the signal obtained by composing the driving signal component and the positive portion of the signal corresponding to the rotational angular velocity are supplied to the smoothing circuit 52.

Figure 5D:
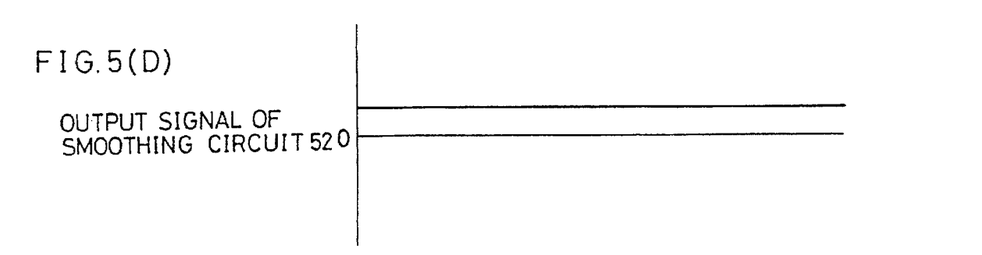

The signal supplied to the smoothing circuit 52 is smoothed, and supplied to the amplifying circuit 54. Since the driving signal component supplied to the smoothing circuit 52 contains the positive and negative portions, the driving signal component is offset by smoothing. Since the signal corresponding to the rotational angular velocity contains only the positive portion, as shown in FIG. 5(D), a positive direct current signal is obtained from the smoothing circuit 52. Since the level of the signal corresponding to the rotational angular velocity is changed according to the rotational angular velocity, the magnitude of the rotational angular velocity can be detected by measuring the level of the direct current signal obtained from the smoothing circuit 52. Since the direction of the Coriolis force is changed according to the direction of the rotational angular velocity, the polarity of the signal generated in the piezoelectric elements 16a and 16b is changed according to the change in the direction of the Coriolis force. In this case, the negative portion of the signal corresponding to the rotational angular velocity is obtained from the first switching circuit 40 and the second switching circuit 46. As a result, a negative direct current signal is obtained from the smoothing circuit 52. In this manner, the direction of the rotational angular velocity can be found by measuring the polarity of the direct current signal obtained from the smoothing circuit 52. The output signal of the smoothing circuit 52 is amplified by the amplifying circuit 54.

Figure 6A:
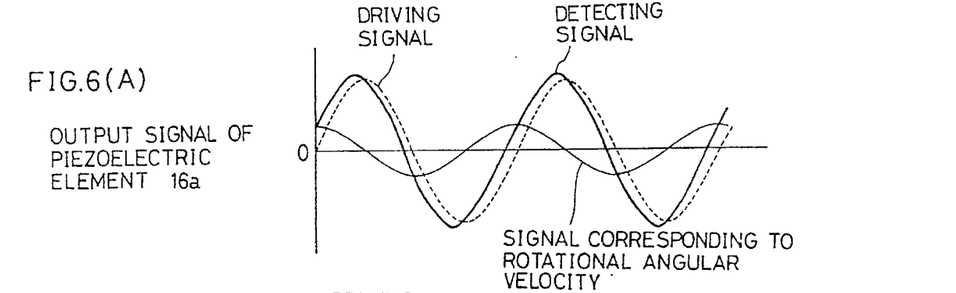
FIGS. 6(A)–6(D) are graphs showing output signals of the two piezoelectric elements and input and output signals of the smoothing circuit when there is a difference between the levels of the driving signals.
Figure 6B:
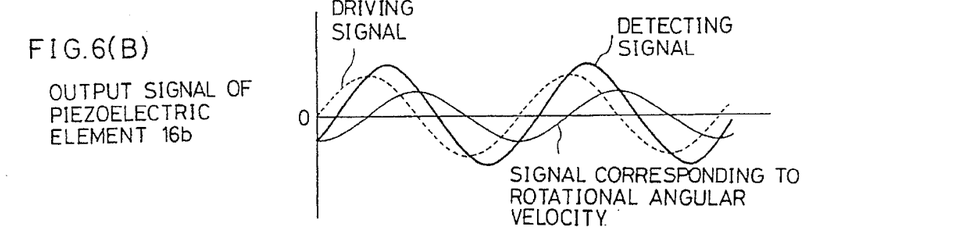
Figure 6C:
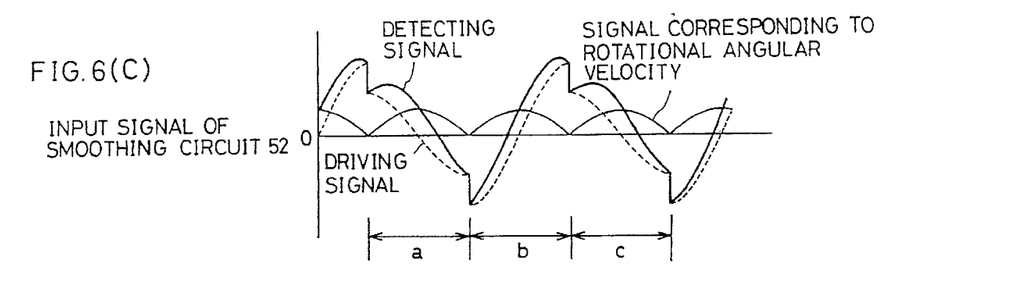
Figure 6D:
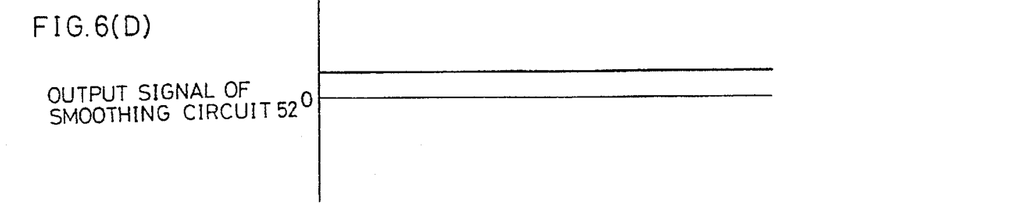

As shown in FIGS. 6(A) and 6(B), difference is generated between the driving signals obtained from the piezoelectric elements 16a and 16b due to the change in the characteristics of the vibrator 12 caused by the change in atmospheric temperature. In this case, too, the positive portion of the signal corresponding to the rotational angular velocity and the positive and negative portions of the driving signal are obtained from the first switching circuit 40 and the second switching circuit 46. At this time, since the level of the driving signal obtained from the first switching circuit 40 is different from that of the driving signal obtained from the second switching circuit 46, a discontinuous driving signal is supplied to the smoothing circuit 52. In this case, since the positive and negative portions are included in the driving signals obtained from the first switching circuit 40 and the second switching circuit 46, the driving signal is offset by smoothing it. Accordingly, as shown in FIG. 6(D), a direct current signal corresponding to the rotational angular velocity can be obtained from the smoothing circuit 52. As described above, only the signal corresponding to the rotational angular velocity can be measured, even though there is the level difference between the driving signals obtained from the piezoelectric elements 16a and 16b.

Figure 7:
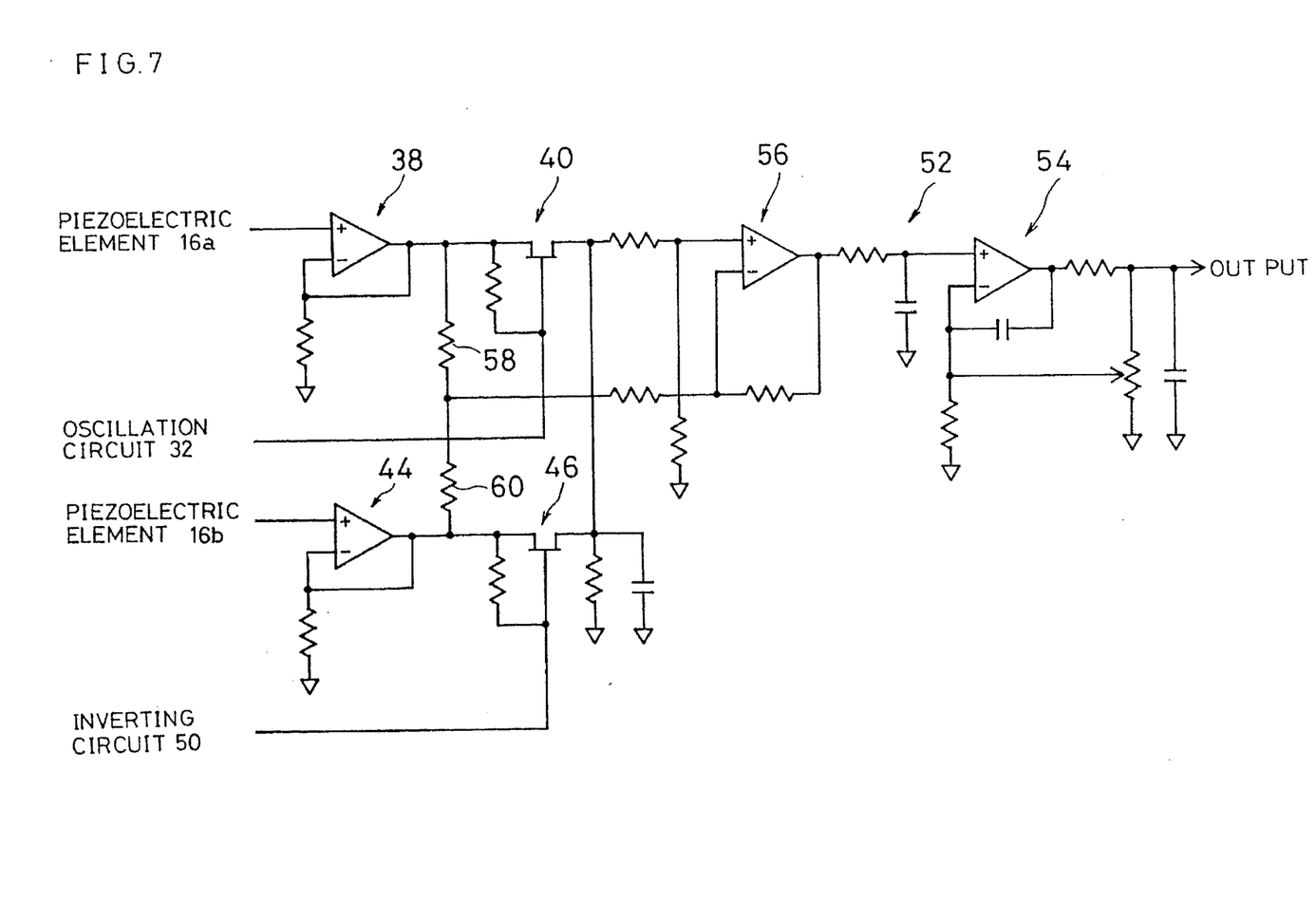
FIG. 7 is a circuit diagram showing a circuit comprising the circuit shown in FIG. 1 and a circuit for removing a driving signal component.

As shown in FIG. 7, a differential circuit 56 may be connected between the first and second switching circuits 40, 46 and the smoothing circuit 52 in order to remove the driving signal components obtained from the first and second switching circuits 40 and 46. An uninverting input terminal of the differential circuit 56 is connected with the output terminal of the first switching circuit 40 and that of the second switching circuit 46. The output signal of the first detection circuit 38 and that of the second detection circuit 44 are divided by resistors 58 and 60, and then supplied to an inverting input terminal of the differential circuit 56. Since signals corresponding to the rotational angular velocity having opposite phases are obtained from the first detection circuit 38 and the second detection circuit 44, the signals corresponding to the rotational angular velocity are offset by composing with the resistors 58 and 60. Half of the sum of the driving signal components obtained from the first detection circuit 38 and the second detection circuit 44 is supplied to the inverting input terminal of the differential circuit 56.

As shown in FIGS. 5(A) and 5(B), in the case that the level of the driving signal obtained from the piezoelectric element 16a is not different from that of the driving signal obtained from the piezoelectric element 16b, the signal supplied to the inverting input terminal of the differential circuit 56 is the same as the driving signal obtained from the piezoelectric elements 16a and 16b. Therefore, only a signal corresponding to the rotational angular velocity is obtained from the differential circuit 56. A direct current signal corresponding to the rotational angular velocity can be obtained by smoothing the output signal of the differential circuit 56. As shown in FIGS. 6(A) and 6(B), in the case that the level of the driving signal obtained from the piezoelectric element 16a is different from that of the driving signal obtained from the piezoelectric element 16b, the driving signal component contained in the signal obtained from the differential circuit 56 becomes small by subtracting the ½ of the sum of the driving signals in the differential circuit 56. Since the driving signal component contains the positive and negative portions, the driving signal component is offset by smoothing it in the smoothing circuit 52.

Figure 8:
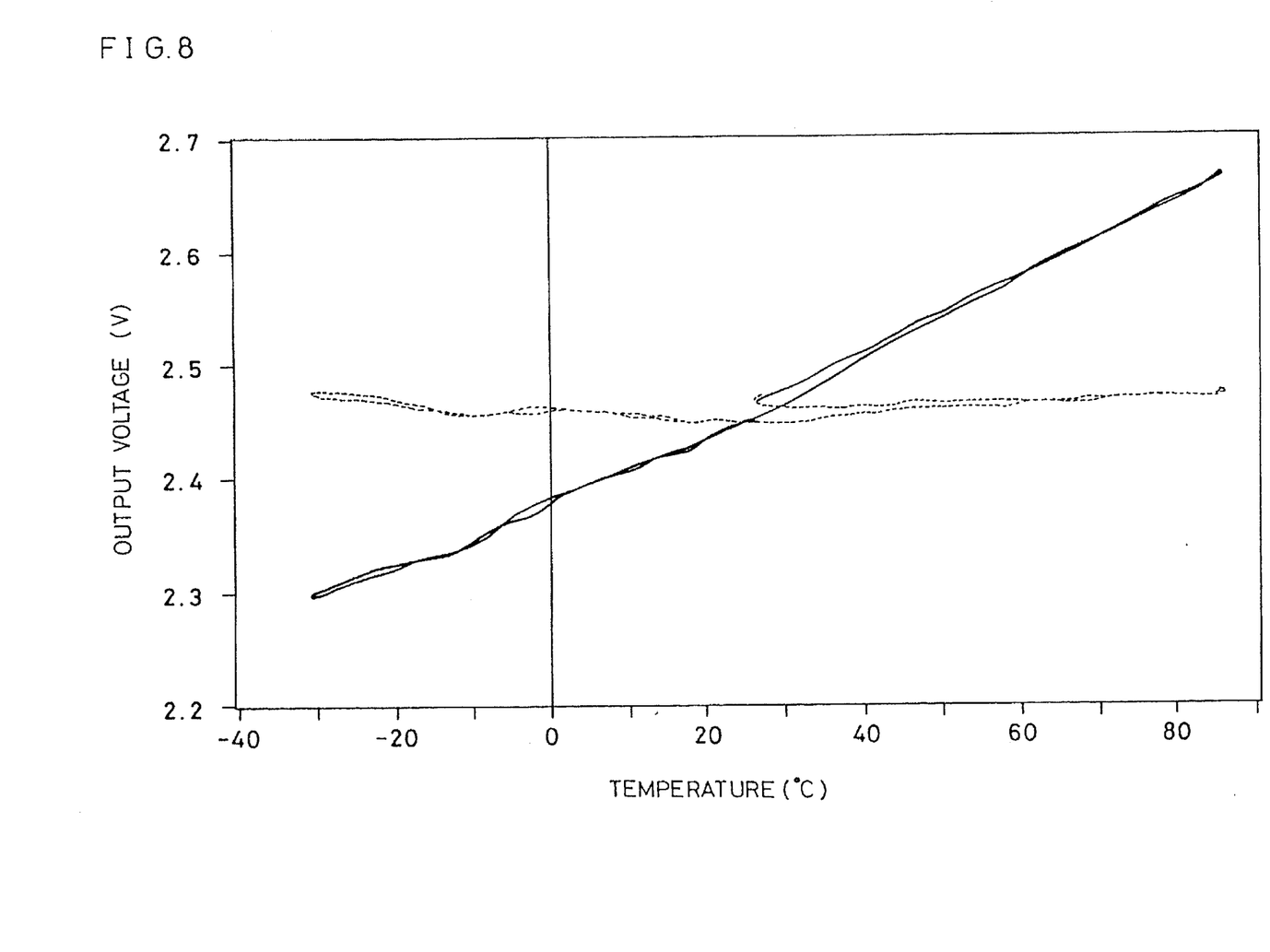
FIG. 8 is a graph showing the output signal of the vibrating gyroscope shown in FIG. 1.

As described above, the influence to be given by the driving signal can be removed by using the vibrating gyroscope detecting system according to the present invention. Thus, even though the levels of the driving signal components are different from each other due to the change in atmospheric temperature, the output signal of the smoothing circuit 52 which contains a phase difference has linearity with respect to the change in atmospheric temperature, as shown by solid lines of FIG. 8. Since the signal having a preferable linearity can be obtained, the inclination of the output signal can be easily corrected.

Figure 9:
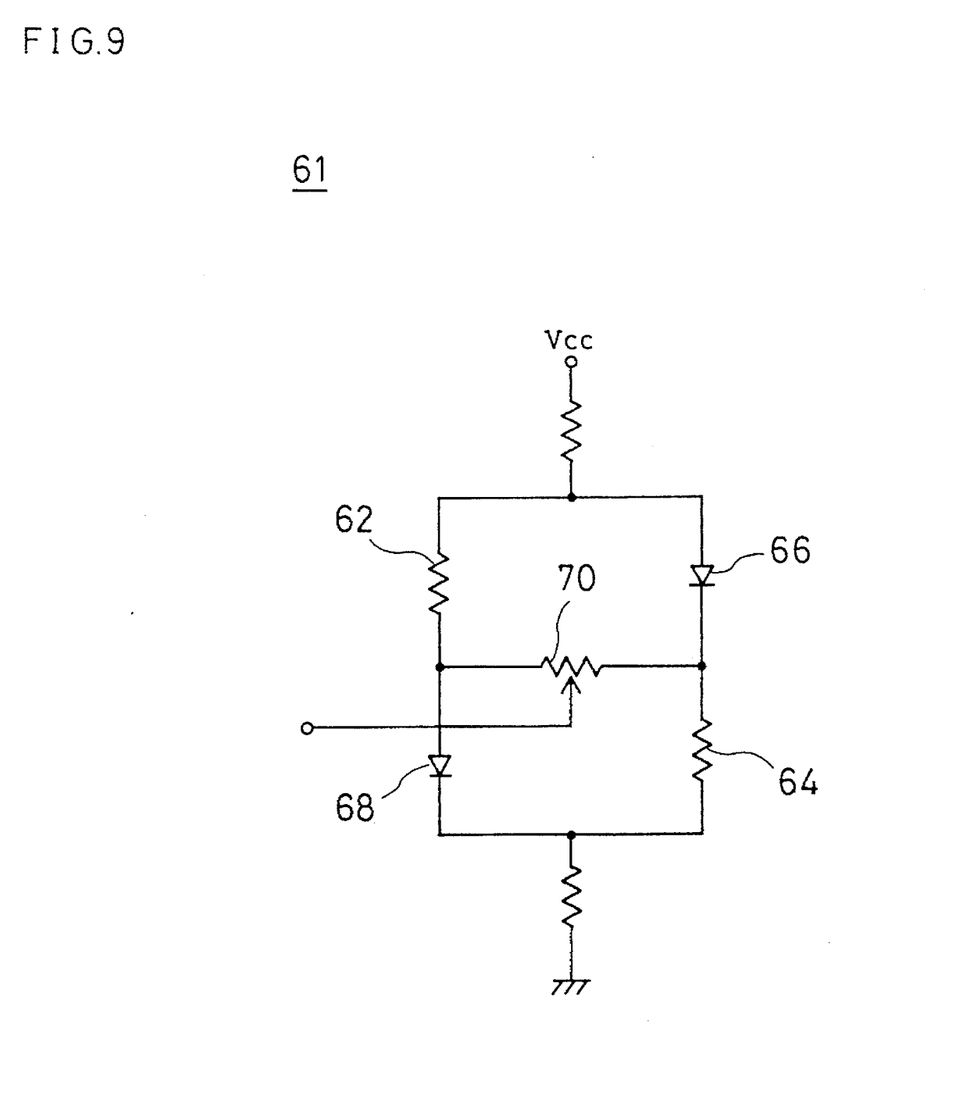
FIG. 9 is a circuit diagram showing an example of a temperature compensating circuit to be added to the circuit shown in FIG. 1.

For example, a temperature correcting circuit 61 as shown in FIG. 9 may be added to the circuit of the vibrating gyroscope. In the temperature correcting circuit 61, two resistor 62, 64 and two diodes 66, 68 constitute a bridge circuit. A variable resistor 70 is connected at the center of the bridge circuit, and the bridge circuit is connected with a power supply Vcc. A variable terminal of the variable resistor 70 is connected with the connection point of the resistors 58 and 60 of the circuit shown in FIG. 7. When the bridge circuit is balanced, electric current does not flow through the variable resistor 70. When atmospheric temperature rises, the resistance value of the diode 66 and that of diode 68 drop, and hence electric current flows through the diodes 66 and 68. As a result, a voltage drop is generated in the variable resistor 70, and the voltage corresponding to the drop is supplied to the connection point of the resistors 58 and 60.

When atmospheric temperature drops, the resistance value of the diode 66 and that of the diode 68 rise, and electric current flows through the resistors 62 and 64. Thus, in the variable resistor 70, there is a voltage drop in a polarity opposite to the voltage drop which has occurred when electric current has flowed through the diodes 66 and 68. Direct current outputs having different inclinations can be obtained for the change in the atmospheric temperature by adjusting the variable terminal of the variable resistor 70. The output signal of the smoothing circuit 52 can be corrected by applying the direct current output of the temperature correcting circuit 61 to the connection point of the resistors 58 and 60. An output signal which is hardly fluctuated with the change in the atmospheric temperature can be obtained by utilizing the temperature characteristics of the diodes, as shown by one-dot chain line of FIG. 8. Needless to say, a temperature correcting circuit may be formed by using temperature transducer other than the diode.

The phase of the driving signal component is adjusted by using the variable resistor 28. But the phase of the driving signal component may be adjusted by performing trimming by using a fixed resistor. In this case, the provision of the variable resistor 28 can be omitted to make non-volume circuit. In the above embodiment, the output signal of the piezoelectric element 16c is fed back to the oscillation circuit, and the output signal of the oscillation circuit is supplied to the piezoelectric elements 16a and 16b. However, in order to driving the bending vibration to the vibrating body 14, it is possible to feed back the output signal of the piezoelectric elements 16a and 16b to the oscillation circuit and supply the output signal of the oscillation circuit to the piezoelectric element 16c. The vibrating body 14 is not limited to the regular triangular prism-shape, but may be other prism-shape such as rectangular prism-shape, cylindrical prism-shape or the like. Further, a vibrator having a vibrating body composed of a piezoelectric material and having electrodes formed on the vibrating body instead of the piezoelectric elements may be used. As apparent from the foregoing description, the vibrating gyroscope detecting system according to the present invention is applicable to the vibrator for detecting the rotational angular velocity based on two detecting signals.

While the present invention has been particularly described and shown, it is to be understood that such description is used merely an illustration and example rather than limitation, and the spirit and scope of the present invention are determined solely by the terms of the appended claims.

What is claimed is:

1. A vibrating gyroscope detecting system comprising:

a vibrating gyroscope for generating two detecting signals for detecting a rotational angular velocity based upon a vibration of a rod-like vibrator, said vibrating gyroscope including said rod-like vibrator, oscillation means for driving said rod-like vibrator, an output signal feedback means for feeding back a signal from said rod-like vibrator to said oscillation means and detection circuit means for detecting rotational angular velocity; and two switching circuits, connected to said detection circuit means, for alternately outputting said two detecting signals; wherein said two switching circuits alternately output said two detecting signals as a composite signal.

2. A vibrating gyroscope detecting system in accordance with claim 1, wherein said two switching circuits alternately output said two detecting signals in synchronous with a signal output by said vibrating gyroscope, said signal corresponding to the rotational angular velocity.

3. A vibrating gyroscope detecting system in accordance with claim 2, which further comprises a differential circuit, connected to the output of said two switching circuits and said vibrating gyroscope, said differential circuit for subtracting ½ of a sum of said two detecting signals from said composite signal.

4. A vibrating gyroscope detecting system accordance with claim 3, which further comprises a smoothing circuit, connected to the output of the differential amplifier, for smoothing said composite signal.

5. A vibrating gyroscope detecting system in accordance with claim 4, which further comprises a temperature compensating circuit, connected to an input of said smoothing circuit, for compensating an output signal of said smoothing circuit according to a change in atmospheric temperature.

6. A vibrating gyroscope detecting system accordance with claim 2, which further comprises a smoothing circuit, connected to the output of said two switching circuits, for smoothing said composite signal.

7. A vibrating gyroscope detecting system in accordance with claim 6, which further comprises a temperature compensating circuit, connected to an input of said smoothing circuit, for compensating an output signal of said smoothing circuit according to a change in atmospheric temperature.

8. A vibrating gyroscope detecting system in accordance with claim 1, which further comprises a differential circuit, connected to the output of said two switching circuits and said vibrating gyroscope, said differential circuit for subtracting ½ of a sum of said two detecting signals from said composite signal.

9. A vibrating gyroscope detecting system accordance with claim 8, which further comprises a smoothing circuit, connected to the output of the direction amplifier, for smoothing said composite signal.

10. A vibrating gyroscope detecting system in accordance with claim 9, which further comprises a temperature compensating circuit, connected to an input of said smoothing circuit, for compensating an output signal of said smoothing circuit according to a change in atmospheric temperature.

11. A vibrating gyroscope detecting system accordance with claim 1, which further comprises a smoothing circuit, connected to the output of said two switching circuits, for smoothing said composite signal.

12. A vibrating gyroscope detecting system in accordance with claim 11, which further comprises a temperature compensating circuit, connected to an input of said smoothing circuit, for compensating an output signal of said smoothing circuit according to a change in atmospheric temperature.

* * * * *